United States Patent
Martin

(10) Patent No.: US 6,208,587 B1
(45) Date of Patent: Mar. 27, 2001

(54) METHOD OF DETECTING SEISMIC EVENTS AND FOR DETECTING AND CORRECTING GEOMETRY AND STATICS ERROR IN SEISMIC DATA

(75) Inventor: Federico D. Martin, Missouri City, TX (US)

(73) Assignee: PGS Tensor, Inc., Houston, TX (US)

( * ) Notice: Subject to any disclaimer, the term of this patent is extended or adjusted under 35 U.S.C. 154(b) by 0 days.

(21) Appl. No.: 08/891,263

(22) Filed: Jul. 10, 1997

(51) Int. Cl.$^7$ .................................................. G01V 1/28
(52) U.S. Cl. ............................. 367/50; 367/41; 367/68
(58) Field of Search ........................... 367/59, 57, 14, 367/63, 38, 50, 41, 68; 364/421

(56) References Cited

U.S. PATENT DOCUMENTS

| | | | |
|---|---|---|---|
| 3,395,386 | * 7/1968 | Brown et al. ........................ | 367/59 |
| 4,570,246 | * 2/1986 | Herkenhoff et al. ................. | 367/58 |
| 4,766,574 | * 8/1988 | Whitmore, Jr. et al. ............. | 367/50 |
| 5,136,550 | 8/1992 | Chambers . | |
| 5,555,218 | 9/1996 | Chambers et al. . | |

FOREIGN PATENT DOCUMENTS

| | | |
|---|---|---|
| 0 447 249 A2 | 9/1991 | (EP) . |
| 98/22835 | 5/1998 | (WO) . |

OTHER PUBLICATIONS

Chung–Kuang P. Chu, et al., First Break Refraction Event Picking Using Fuzzy Logic Systems, IEEE Transaction on Fuzzy Systems, vol. 2, No. 4 Nov. 1, 1994, pp. 255–266.

Brian Russell, et al. "Noise Elimination and the Radon Transform," Geophysics: The Leading Edge of Exploration, vol. 9, No. 10, Oct. 9, 1990, pp. 18–23.

George A. McMechan, et al., "Analysis of Dispersive Waves by Wave Field Transformation," Geophysics, vol. 46, No. 6. Jun. 1, 1981, pp. 869–874.

J. Morlet, et al., "Wave Propagation and Sampling Theory – Part I: Complex Signal and Scattering in Multilayered Media," Geophysics, vol. 47, No. 2, Feb 1, 1982, pp. 203–221.

Joong H. Chun et al., "First Arrival Time Surface, Estimation of Statics," Oil & Gas Journal, vol. 81, No. 36, Sep. 1, 1983, pp. 162–170.

* cited by examiner

*Primary Examiner*—Christine Koda
*Assistant Examiner*—Anthony Jolly
(74) *Attorney, Agent, or Firm*—Arnold & Associates

(57) ABSTRACT

Methods are provided for automatic detection of linear seismic events and the detected events are used in correction of statics and geometry error. According to an example embodiment, a method is provided for automatically detecting substantially linear seismic events in multiple element data, and for correcting geometry and statics errors, wherein at least one element of the data comprises a shot and at least one other element of the data comprises a receiver, for a common element gather of traces, the method comprising: band pass filtering the traces; computing the complex trace envelope of traces of the gather; filtering out a DC component of the traces; sorting the gather by a first element line, a first element, a second element line, a second element, and an offset bin, wherein a sorted gather of traces is defined; wherein said computing and said sorting define a sorted gather of complex trace envelopes; transforming the sorted gather of complex trace envelopes into a set of velocity stack trace envelopes; wherein said traces are divergence corrected before said transforming and wherein said traces are positive bulk time shifted before said transforming; picking events from the velocity stack trace envelopes; determining statics error based on said picking; correcting said statics error; determining geometry error based on said picking; and correcting said geometry error.

49 Claims, 1 Drawing Sheet

Figure 1:
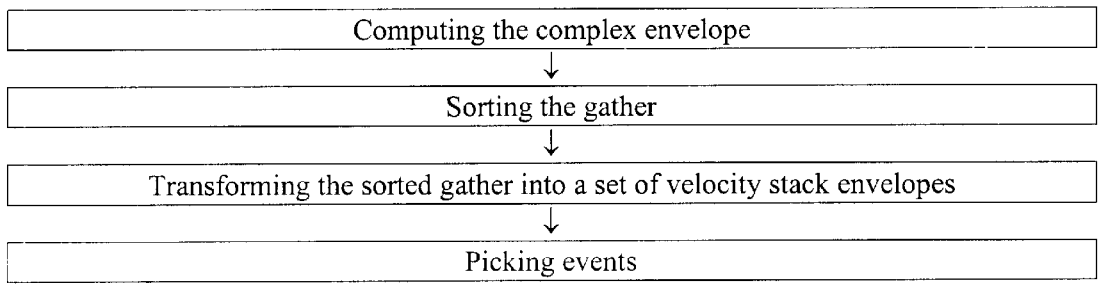

METHOD FOR AUTOMATICALLY DETECTING SUBSTANTIALLY LINEAR
SEISMIC EVENTS IN MULTIPLE ELEMENT DATA

METHOD OF DETECTING SEISMIC EVENTS AND FOR DETECTING AND CORRECTING GEOMETRY AND STATICS ERROR IN SEISMIC DATA

BACKGROUND OF THE INVENTION

This invention relates to the field of seismic data processing and specifically to methods for detecting arrival events, such as direct arrivals and refractions, and for detecting geometry and statics errors in seismic data.

In seismic prospecting, signals are generated at signal source locations by sources (e.g. air guns, dynamite, and vibrators) which travel through media, sometimes being refracted and reflected, and are received at receivers (e.g. hydrophones and geophones, a.k.a. pressure detectors and particle velocity detectors, respectively). The reflections and refractions include information from which subsurface geology is determined. However, the process of acquiring the data is susceptible to error.

For example, the amplitude of a particular shot from a particular source may not be as designed. A receiver may not be well-coupled (either to the recorder or the ground). Further, problems in sources and receivers may be intermittent. As the number of sources and receivers increase, and as the volume of data increases with more and more dense 3D seismic activities, detection of such error becomes more and more difficult.

Also, it is important to know the precise location of the sources and receivers, relative to one another. Again, as data volume has increased, this has become a particularly difficult problem, especially in marine environments, including ocean bottom cable and towed streamer applications.

Even further, allowance must be made for variation in the elevation of receivers and sources, as well as variance in the depth to the sub-weathered layer, since the perceived depth of a particular event in a record is related to the time difference from the instant of the shot to the reception of the response to the shot. This is typically known as "statics" correction.

In determining actual source or receiver location, and in performing statics corrections, typically, the first energy received by the receiver (a.k.a. the "first break") is used. For example, in some cases, the first break is the "direct arrival" (a signal received from the source which has not been reflected or refracted). In other cases, the first break is a refracted signal (e.g. in some ocean bottom cable situations).

Triangulation or least squares techniques use the first break to determine the relative position of shots and receivers. In the case of statics corrections, a decomposition algorithm is used, having the following general formula:

$$\Delta t = \Delta xy + \text{shot static error} + \text{receiver static error}$$

where $\Delta xy$ is the position error of the shot and receiver, and where $\Delta t$ is derived from refractors found in the data. See, Yilmaz, *Seismic Data Processing*, V.2, Ch 3, pp. 155–240, Society of Exploration Geophysicists (Tulsa, 1987).

To determine the correct $\Delta t$ function, however, the first break must be determined. This is not a trivial task. In fact, it has proven to be very difficult.

Currently, although attempts at automatic picking of the first break have been made, the picking still requires manual work, for most jobs. This manual work includes the time-consuming visual inspection of the data, since the automated processes are highly sensitive to noise. Further, the manual work may require a priori knowledge of the velocity, which is not always available. Visual inspection for good quality control defeats the very purpose of an automated system. Therefore, a reliable, automated system for detecting seismic events, such as the first break, is needed.

Furthermore, techniques using first breaks can only work with a single event per time axis. And, since the first break is the direct arrival for deep water cases only, traditional methods use only a few direct arrival traces for shallow water, disregarding all other traces where the direct arrival occurs at later time than the first break. A technique in which multiple events, especially one which could distinguish between the direct arrival and differing reflections is needed to provide greater flexibility and accuracy in the geometry correction and statics correction areas.

Even further still, current geometry and statics correction processes use only first break information, making it more difficult to identify the type of error occurring. Therefore, a method is needed for detection and correction of geometry error and a method of detection and correction of statics error which the type of error is identifiable. Even further, current picking algorrythms using correlation and stack/correlation techniques are subject to cycle skips, which is common, but very undesireable.

SUMMARY OF THE INVENTION

It is an object of the present invention to address the above-identified needs.

Therefore, according to one aspect of the invention, a method is provided for automatically detecting substantially linear seismic events in multiple element data, and for correcting geometry and statics errors, wherein at least one element of the data comprises a shot and at least one other element of the data comprises a receiver, for a common element gather of traces, the method comprising:

band pass filtering the traces;

computing the complex trace envelope of traces of the gather;

filtering out a DC component of the traces;

sorting the gather by a first element line, a first element, a second element line, a second element, and an offset bin, wherein a sorted gather of traces is defined;

wherein said computing and said sorting define a sorted gather of complex trace envelopes;

transforming the sorted gather of complex trace envelopes into a set of velocity stack trace envelopes; wherein said traces are divergence corrected before said transforming and wherein said traces are positive bulk time shifted before said transforming; and picking events from the velocity stack trace envelopes;

determining statics error based on said picking;

correcting said statics error;

determining geometry error based on said picking; and correcting said geometry error.

According to a further aspect of the invention, a method is provided for automatically detecting substantially linear seismic events in multiple element data, wherein at least one element of the data comprises a shot and at least one other element of the data comprises a receiver, for a common element gather of traces, the method comprising:

computing the complex trace envelope of traces of the gather;

sorting the gather by a first element line, a first element, a second element line, and a second element, wherein a sorted gather of traces is defined;

wherein said computing and said sorting define a sorted gather of complex trace envelopes;

transforming the sorted gather of complex trace envelopes into a set of velocity stack trace envelopes; and picking events from the velocity stack trace envelopes.

According to a further aspect of the invention, another method is provided, for correcting statics errors in a set of seismic data comprising assembling a set of velocity stack trace envelopes, wherein the velocity stack trace envelopes have a particular shot and receiver location associated with each trace, wherein the velocity stack trace envelopes include representations of multiple event arrivals, wherein some of the event arrivals represent the direct arrival and some represent events other than the direct arrival, wherein the velocity stack trace envelopes include event attributes comprising: time, amplitude, and velocity information for each event;

comparing at least one event attribute of at least one of the multiple event arrivals to at least one event attribute of at least one other of the multiple event arrivals; and assigning a statics correction to a source-receiver, dependent upon the comparing.

According to still an another aspect of the present invention, a method is provided for discrimination between statics, geometry, source, and received problems, the method comprising:

assembling a set of velocity stack trace envelopes, wherein the velocity stack trace envelopes have a particular shot and receiver location associated with each trace, wherein the velocity stack trace envelopes include representations of multiple event arrivals, wherein some of the event arrivals represent the direct arrival and some represent events other than the direct arrival, wherein the velocity stack trace envelopes include event attributes comprising: time, amplitude, and velocity information for each event;

comparing at least one event attribute of at least one of the multiple event arrivals to a threshold value for the at least one event attribute;

discriminating between error type, dependent upon the comparing.

According to an even further aspect of the present invention, a method is provided for correcting geometry errors in a set of seismic data traces, the traces being related to a first element location and a second element location, one of the element locations being a shot location and the other of the s being a receiver location, the method comprising:

assembling a set of velocity stack trace envelopes;

picking a seismic event from the set of velocity stack trace envelopes;

comparing a time delay between the first element location and the second element location to a time delay threshold; and assigning a geometry correction to at least one of the element locations; dependent upon the comparing.

Other aspects and embodiments will be apparent to a person of ordinary skill upon review of the following Detailed Description of Example Embodiments of the Invention.

DETAILED DESCRIPTION OF EXAMPLE EMBODIMENTS OF THE INVENTION

According to one aspect of the present invention as illustrated, in flowchart form, in FIG. 1, a method is provided for automatically detecting substantially linear seismic events in multiple element data. At least one element of the data comprises a shot location and at least one other element of the data comprises a receiver location. The data are gathered in a common element gather (e.g. common shot or common receiver), and the complex trace envelope of traces of the gather is computed. Also, the gather is sorted by a first element line location (e.g. receiver line location, a first element location (e.g. receiver location), a second element line (e.g. a shot line location), and a second element (e.g. shot location), wherein a sorted gather of traces is defined. In this example, the receiver is identified as the first element and the shot as the second element, but it will be understood that they are reversed in alternative embodiments of the invention.

After the sorting of the traces and computation of the complex trace envelopes, a gather of sorted trace envelopes is the result, and the method then transforms the sorted gather of trace envelopes into a set of velocity stack trace envelopes, and events are picked from the velocity stack trace envelopes.

As used herein, velocity stack trace envelopes are the result of performing a tau-p transform (a.k.a. "slant stack") process on the sorted envelopes, or performing linear moveout with a single velocity (e.g. the water velocity in the case of bottom cable). The picking of the events from the velocity stack trace envelopes is then carried out by a number of processes, such as maxima detection.

The above method yields as many events ("event" meaning direct arrival, first refraction, second refraction, etc.) as are picked from the velocity stack traces. And, it should be noted that the picked events will have the following information associated with them if the tau-p transform process is used: time, amplitude, and velocity.

Various additional steps are provided according to various embodiments of the invention. For example, in one embodiment, the transforming of the sorted gather of traces into a set of velocity stack trace envelopes comprises muting the direct arrival and the data in the traces after the direct arrival and applying a tau-p transform. While, according to an alternative embodiment, the transforming of the sorted gather of traces into a set of velocity stack trace envelopes comprises cluster maxima detection to detect events other than the direct arrival. Further steps include: divergence correcting the traces before the transforming, band pass filtering the traces (using a source array dependent band pass filter for the detection of the direct arrival, and a band pass filter for all other events, as described in more detail below), filtering out a DC component of the traces, and positive bulk time shifting the traces before the transforming.

Regarding the band pass filtering, it has been found that the use of a specific type of filter for the direct arrival is particularly useful. As used herein, that filter is called a "source array dependent band pass filter," which is a high pass filter in which the cut frequencies are derived from the source array k filter for a given event apparent velocity.

According to still a further embodiment of the present invention, the velocity stack traces are taken from a three dimensional survey, in which the offset bin information is preserved and used to build a cube of traces, referred to herein as a 3D velocity stack cube, plotted in, for example, shot line, shot, receiver line, receiver, offset bin, and time.

Depending on which events are picked, such a cube represents the refractor structure and also the direct arrival horizon showing the geometry positions. If there are no geometry errors, the horizon will be flat. In the event there are geometry errors, the error will be seen in the cube. Further more, quality control issues will be detectable from the cube in that anomalies in the horizons will show various types of errors (e.g. misfires, in which all picks will have been shifted in the same amount, or direct arrival behavior which is different from the arrival of a refraction). Therefore, the velocity stack traces are used in accordance with a further aspect of the invention to determine geometry errors. While according to still a further aspect of the invention, the velocity stack traces are used to determine statics errors.

According to still a further embodiment of the invention, as explained in more detail below, events are associated with specific shot-receiver pairs, and various components of the events are analyzed (for example, by comparison to thresholds or other events) to determine geometry errors, static errors, and/or quality control (i.e., strength of source, miscalibration of receivers, etc.). In one specific example, guided correlation is used, as is traditional statics analysis.

According to more specifics examples of embodiments of the present invention, reformatted land header traces are input, represented by Sij(xys) Rkl(xys), A(X,t), where:
   i=a source line index,
   j=a source index,
   k=a receiver line index,
   l=a receiver index,
   xys=x,y coordinates+water depth, and
   A(X,t)=amplitude of the trace as a function of offset (X) and time (t).

In a source process, the following steps are followed:
Event Detection Process:
1) Sort by Sij, reciever line to build a matrix having: {Sij,. Rkl, A(Xt)}, k=constant
2) Compute the approximate water critical distance Xc at Sij according to any process known to those of skill in the art.
3) Compute the number of bins (m) and the maximum and minimum offsets of the bins (Xmin/max) according processes known to those of skill in the art.
4) Compute the average offset within the m offset bins to define Xm
5) Extract a time window TX for each Sij, A(X,t), where TX=Tmax(Vw,X), where Vw=water velocity and X is the offset.
6) Sort by m to build the matrix {Sij, Rkl, m, A(X,t)}
7) Compute Rm(x,y,s)=average of Rk(x,y,s) for all traces in the offset bin m.
8) Duplicate the trace data, apply source array dependent high pass filter for the water arrival detection (one data set), apply regular band pass filter to the other data set.
9) Compute complex trace envelope on both data sets.
10) Apply linear move out to data set one, at V=Vw and stack the m offset bin traces, A(X,t) to build {Sij, Rmk, As(Vw,t)}, where Vw=water velocity=Vd=direct arrival time. Notice l=receiver index is replaced by m=offset bin index.
11) Mute the direct arrival and all data later than the direct arrival to data set two
12) Slant stack (tau-p transform) the data set two , A(X,t) to build {Sij, m, As(Vs,t)}, where As(Vs,t) is the slant stack amplitude for each velocity and time index, or, if traces are noisy, use diversity slant stack.
13) Find the tau-p trace (As(Vs,t)) with the maximum amplitude (Asmax(t)) within the transform. That is Asmax(t) =MAX{As(Vs,t)}, and Vsmax=velocity associated to the Asmax(t). An alternative method is by cluster center maximum detection.
14) write {Sij, Rmk, Xm, Asmax(t), Vr} including Vw data. Notice that Vr=Vsmax=refractor velocity and Asmax=amplitude of the velocity stack trace= amplitude of the refracted velocity=Ar
15) loop over m (offset bins)
16) write {Sij, Rmk, Asmax(Xm,t), Vr}
17) loop over Rk (reciever line)
18) write {Sij, Rmk, Asmax(Xm,t), Vr}
19) build cubes (Rmk(x,y), Asmax(t)} & {Rml(x,y), Vr}
20) pick cubes tr(Sij, Rmk, Asmax, Vr) by correlation and td(Sij,Rmk, Assd, Vw) finding maxima. Where tr=refractor time, td=direct arrival time It will be understood by those of ordinary skill that the same process as described above is used in alternative embodiments as a receiver process, where R and S are interchanged.

Event Discrimination Process:

From this type of data, various information is deduced. For example, many of the parameters written above are compared to threshold values, and/or to zero, to determine if an error exists in the data. In one specific embodiment, a value TTHRSH is determined as a function of Rxkl and s. The TTHRSH value is compared against td and or tr, (arrival times for the direct arrival and a refraction, respectively).

According to still a further embodiment, for QC purposes, the following matrix is calculated:

|  | TTHRSH | | ATHRSH | | VTHRSH |
|---|---|---|---|---|---|
|  | td | tr | Ad | Ar Vd | Vr |
| Sij |  |  |  |  |  |
| R11 |  |  |  |  |  |
| R21 |  |  |  |  |  |
| ... |  |  |  |  |  |

A cube is built by calculating such a matrix for all Rkl's. Errors are detected by data in the cube that fall above or below a given threshold or are zero. For example, if there is a geometry error, most of the data points in a given matrix will be bad. If there is a statics error, on the other hand, the tr value will be bad, while other values are good. Further, if there is a receiver line error, a constant error will appear for all the points on that given receiver line (e.g. amplitude=0). Thus, in a QC process useful according to another aspect of the invention, event attributes (as used herein, "event attributes" comprise: for example, td, tr, Ad, Ar, Vd, and Vr) are compared to threshold values and QC problems are flagged based on that comparison. The type of QC error is determined from the pattern of non-conformance with the particular event attribute. In some embodiments, the error is plotted in the velocity stack cube (e.g. with a specific color designating a specific type of error) and the errors are plotted along with the xy contours. Next, all flagged Sij an Rkl trace gathers are plotted.

According to an alternative embodiment, rather than comparing the event attributes to threshold values, the event attributes for at least one trace are compared to the event attributes of at least one other trace. Errors are assigned to variances outside a predetermined level.

Geometry and Statics Corrections:

According to an even further aspect of the invention, geometry corrections are provided by running triangulation or least squares location algorithms using the direct arrival attributes td tr(Sij(xy), Rmk(xy), Ad, Vd). A recomputed receiver location Sij(x',y') is then applied.

According to an even further aspect of the invention, static corrections are provided by running conventional residual statics algorithms using the refractor arrival attributes td tr(Sij(x'y'), Rmk(xy), Ar, Vr).

Further embodiments and aspects of the invention will occur to those of skill in the art without departing from the spirit of the present invention.

Further embodiments and aspects of the invention will occur to those of skill in the art without departing from the spirit of the present invention.

What is claimed is:

1. A method for automatically detecting substantially linear seismic events in multiple element data, wherein at least one element of the data comprises a shot and at least one other element of the data comprises a receiver, for a common element gather of traces, the method comprising:
   computing the complex trace envelope of traces of the gather;
   sorting the gather by a first element line, a first element, a second element line, and a second element, wherein a sorted gather of traces is defined;
   wherein said computing and said sorting define a sorted gather of complex trace envelopes;
   transforming the sorted gather of complex trace envelopes into a set of velocity stack trace envelopes; and
   picking events from the velocity stack trace envelopes.

2. A method as in claim 1 wherein said transforming the sorted gather of traces into a set of velocity stack trace envelopes comprises:
   slant stack transforming of the gather of traces and maxima detecting.

3. A method as in claim 1 wherein said transforming the sorted gather of traces into a set of velocity stack trace envelopes comprises muting the direct arrival and the data in the traces after the direct arrival and applying a tau-p transform.

4. A method as in claim 1 wherein said picking comprises cluster maxima detection.

5. A method as in claim 1 wherein said transforming the sorted gather of traces into a set of velocity stack trace envelopes comprises applying a tau-p transform.

6. A method as in claim 1 wherein said sorting further comprises sorting the gather by offset bin.

7. A method as in claim 1 further comprising divergence correcting the traces before said transforming.

8. A method as in claim 1 further comprising band pass filtering the traces.

9. A method as in claim 8 wherein said band pass filtering comprises source array dependent band pass filtering.

10. A method as in claim 1 further comprising filtering out a DC component of the traces.

11. A method as in claim 1 further comprising positive bulk time shifting the traces before said transforming.

12. A method for correcting statics errors in a set of seismic data comprising
   assembling a set of velocity stack trace envelopes,
   wherein the velocity stack trace envelopes have a particular shot and receiver location associated with each trace,
   wherein the velocity stack trace envelopes include representations of multiple event arrivals,
   wherein some of the event arrivals represent the direct arrival and some represent events other than the direct arrival,
   wherein the velocity stack trace envelopes include event attributes comprising: time, amplitude, and velocity information for each event;
   comparing at least one event attribute of at least one of the multiple event arrivals to at least one event attribute of at least one other of the multiple event arrivals; and
   assigning a statics correction to a source-receiver, dependent upon the comparing.

13. A method as in claim 12 wherein said assembling comprises
   computing the complex trace envelope of traces of a gather;
   sorting the gather by a first element line, a first element, a second element line, and a second element, wherein a sorted gather of traces is defined;
   wherein said computing and said sorting define a sorted gather of complex trace envelopes;
   transforming the sorted gather of complex trace envelopes into a set of velocity stack trace envelopes; and
   picking events from the velocity stack trace envelopes.

14. A method as in claim 12 wherein said transforming the sorted gather of traces into a set of velocity stack trace envelopes comprises:
   slant stack transforming of the gather of traces and maxima detecting.

15. A method as in claim 13 wherein said transforming the sorted gather of traces into a set of velocity stack trace envelopes comprises muting the direct arrival and the data in the traces after the direct arrival and applying a tau-p transform.

16. A method as in claim 13 wherein said picking comprises cluster maxima detection.

17. A method as in claim 13 wherein said transforming the sorted gather of traces into a set of velocity stack trace envelopes comprises applying a tau-p transform.

18. A method as in claim 13 further comprising divergence correcting the traces before said transforming.

19. A method as in claim 13 further comprising band pass filtering the traces.

20. A method as in claim 19 wherein said band pass filtering comprises source array dependent band pass filtering.

21. A method as in claim 13 further comprising filtering out a DC component of the traces.

22. A method as in claim 13 further comprising positive bulk time shifting the traces before said transforming.

23. A method for discrimination between statics, geometry, source, and received problems, the method comprising:
   assembling a set of velocity stack trace envelopes,
   wherein the velocity stack trace envelopes have a particular shot and receiver location associated with each trace,
   wherein the velocity stack trace envelopes include representations of multiple event arrivals,
   wherein some of the event arrivals represent the direct arrival and some represent events other than the direct arrival,
   wherein the velocity stack trace envelopes include event attributes comprising: time, amplitude, and velocity information for each event;
   comparing at least one event attribute of at least one of the multiple event arrivals to a threshold value for the at least one event attribute; and
   discriminating between error type, dependent upon the comparing. assembling a set of velocity stack trace envelopes.

24. A method as in claim 23 wherein said assembling comprises
  computing the complex trace envelope of traces of a gather;
  sorting the gather by a first element line, a first element, a second element line, and a second element, wherein a sorted gather of traces is defined;
  wherein said computing and said sorting define a sorted gather of complex trace envelopes;
  transforming the sorted gather of complex trace envelopes into a set of velocity stack trace envelopes; and
  picking events from the velocity stack trace envelopes.

25. A method as in claim 24 wherein said transforming the sorted gather of traces into a set of velocity stack trace envelopes comprises:
  slant stack transforming of the gather of traces and
  maxima detecting.

26. A method as in claim 23 wherein said transforming the sorted gather of traces into a set of velocity stack trace envelopes comprises muting the direct arrival and the data in the traces after the direct arrival and applying a tau-p transform.

27. A method as in claim 23 wherein said picking comprises cluster maxima detection.

28. A method as in claim 23 wherein said transforming the sorted gather of traces into a set of velocity stack trace envelopes comprises applying a tau-p transform.

29. A method as in claim 23 further comprising divergence correcting the traces before said transforming.

30. A method as in claim 23 further comprising band pass filtering the traces.

31. A method as in claim 30 wherein said band pass filtering comprises source array dependent band pass filtering.

32. A method as in claim 23 further comprising filtering out a DC component of the traces.

33. A method as in claim 23 further comprising positive bulk time shifting the traces before said transforming.

34. A method for correcting geometry errors in a set of seismic data traces, the traces being related to a first element location and a second element location, one of the element locations being a shot location and the other of the s being a receiver location, the method comprising:
  assembling a set of velocity stack trace envelopes including offset bin information;
  picking a seismic event from the set of velocity stack trace envelopes;
  comparing a time delay between the first element location and the second element location to a time delay threshold; and
  assigning a geometry correction to at least one of the element locations; dependent upon the comparing.

35. A method as in claim 34 wherein said assembling comprises: assigning the traces to offset bins and applying moveout correction to the traces.

36. A method as in claim 34 wherein said assembling comprises
  computing the complex trace envelope of traces of a gather;
  sorting the gather by a first element line, a first element, a second element line, and a second element, wherein a sorted gather of traces is defined;
  wherein said computing and said sorting define a sorted gather of complex trace envelopes;
  transforming the sorted gather of complex trace envelopes into a set of velocity stack trace envelopes; and
  picking events from the velocity stack trace envelopes.

37. A method as in claim 34 wherein said transforming the sorted gather of traces into a set of velocity stack trace envelopes comprises:
  slant stack transforming of the gather of traces and
  maxima detecting.

38. A method as in claim 34 wherein said transforming the sorted gather of traces into a set of velocity stack trace envelopes comprises muting the direct arrival and the data in the traces after the direct arrival and applying a tau-p transform.

39. A method as in claim 34 wherein said picking comprises cluster maxima detection.

40. A method as in claim 34 wherein said transforming the sorted gather of traces into a set of velocity stack trace envelopes comprises applying a tau-p transform.

41. A method as in claim 34 further comprising divergence correcting the traces before said transforming.

42. A method as in claim 34 further comprising band pass filtering the traces.

43. A method as in claim 42 wherein said band pass filtering comprises source array dependent band pass filtering.

44. A method as in claim 34 further comprising filtering out a DC component of the traces.

45. A method as in claim 34 further comprising positive bulk time shifting the traces before said transforming.

46. A method for automatically detecting substantially linear seismic events in multiple element data, wherein at least one element of the data comprises a shot and at least one other element of the data comprises a receiver, for a common element gather of traces, the method comprising:
  band pass filtering the traces;
  computing the complex trace envelope of traces of the gather;
  filtering out a DC component of the traces;
  sorting the gather by a first element line, a first element, a second element line, a second element, and an offset bin, wherein a sorted gather of traces is defined;
  wherein said computing and said sorting define a sorted gather of complex trace envelopes;
  transforming the sorted gather of complex trace envelopes into a set of velocity stack trace envelopes; wherein said traces are divergence corrected before said transforming and wherein said traces are positive bulk time shifted before said transforming; and
  picking events from the velocity stack trace envelopes.

47. A method for automatically correcting geometry errors in seismic data including substantially linear seismic events in multiple element data, wherein at least one element of the data comprises a shot and at least one other element of the data comprises a receiver, for a common element gather of traces, the method comprising:
  band pass filtering the traces;
  computing the complex trace envelope of traces of the gather;
  filtering out a DC component of the traces;
  sorting the gather by a first element line, a first element, a second element line, a second element, an offset bin, wherein a sorted gather of traces is defined;
  wherein said computing and said sorting define a sorted gather of complex trace envelopes;
  transforming the sorted gather of complex trace envelopes into a set of velocity stack trace envelopes; wherein said traces are divergence corrected before said transforming and wherein said traces are positive bulk time shifted before said transforming;

picking events from the velocity stack trace envelopes;

determining geometry error based on said picking; and correcting said geometry error.

48. A method for automatically correcting statics errors in seismic data including substantially linear seismic events in multiple element data, wherein at least one element of the data comprises a shot and at least one other element of the data comprises a receiver, for a common element gather of traces, the method comprising:

band pass filtering the traces;

computing the complex trace envelope of traces of the gather;

filtering out a DC component of the traces;

sorting the gather by a first element line, a first element, a second element line, a second element, and an offset bin wherein a sorted gather of traces is defined;

wherein said computing and said sorting define a sorted gather of complex trace envelopes;

transforming the sorted gather of complex trace envelopes into a set of velocity stack trace envelopes; wherein said traces are divergence corrected before said transforming and wherein said traces are positive bulk time shifted before said transforming;

picking events from the velocity stack trace envelopes;

determining statics error based on said picking; and correcting said statics error.

49. A method for automatically detecting substantially linear seismic events in multiple element data, and for correcting geometry and statics errors, wherein at least one element of the data comprises a shot and at least one other element of the data comprises a receiver, for a common element gather of traces, the method comprising:

band pass filtering the traces;

computing the complex trace envelope of traces of the gather;

filtering out a DC component of the traces;

sorting the gather by a first element line, a first element, a second element line, a second element, and an offset bin, wherein a sorted gather of traces is defined;

wherein said computing and said sorting define a sorted gather of complex trace envelopes;

transforming the sorted gather of complex trace envelopes into a set of velocity stack trace envelopes; wherein said traces are divergence corrected before said transforming and wherein said traces are positive bulk time shifted before said transforming; and picking events from the velocity stack trace envelopes;

determining statics error based on said picking;

correcting said statics error;

determining geometry error based on said picking; and correcting said geometry error.

* * * * *

UNITED STATES PATENT AND TRADEMARK OFFICE
CERTIFICATE OF CORRECTION

PATENT NO. : 6,208,587 B1
DATED : March 27, 2001
INVENTOR(S) : Frederico D. Martin It is certified that error appears in the above-identified patent and that said Letters Patent is hereby corrected as shown below:

Title page,
OTHER PUBLICATIONS, after "Chu et al.," insert -- " --.
OTHER PUBLICATIONS, after "Logic Systems," insert -- " --.
OTHER PUBLICATIONS, replace "Transaction" with -- Transactions --.
OTHER PUBLICATIONS, after "vol. 2, No. 4" insert -- , --.
OTHER PUBLICATIONS, after "Russel et al." insert -- , --.

Column 1,
Line 67, "a priori" should read -- *a priori* --.

Column 2,
Line 21, delete "algorrythms" and insert -- algorithms --.
Line 22, delete "is" and insert -- are --.
Line 50, delete "and".

Column 3,
Line 8, after "comprising" insert -- : --.
Line 27, delete "still an another" and insert -- still another --.
Line 54, delete "of the s being" and insert -- of the element locations being --.

Column 5,
Line 5, replace "Further more" with -- Furthermore --.
Line 23, replace "specifics" with -- specific --.
Line 36, replace "reciever" with -- receiver --.
Line 37, after "k=constant" insert -- . --.
Line 45, after "define Xm" insert -- . --.
Line 63, after "set two" insert -- . --.

Column 6,
Line 6, delete "14) write" and insert -- 14) Write --.
Line 9, after "velocity=Ar" insert -- "." --.
Line 10, replace "15) loop" with -- 15) Loop --.
Line 10, after "(offset bins)" insert -- . --.
Line 11, replace "16) write" with -- 16) Write --.
Line 11, after "Vr}" insert -- . --.
Line 12, replace "17) loop" with -- 17) Loop --.
Line 12, after "(receiver line)" insert -- . --.
Line 13, replace "18) write" with -- 18) Write --.
Line 13, after "Vr}" insert -- . --.
Line 14, replace "19) build" with -- 19) Build --.
Line 14, after "Vr}" insert -- . --.

UNITED STATES PATENT AND TRADEMARK OFFICE
CERTIFICATE OF CORRECTION

PATENT NO. : 6,208,587 B1
DATED : March 27, 2001
INVENTOR(S) : Frederico D. Martin It is certified that error appears in the above-identified patent and that said Letters Patent is hereby corrected as shown below:

Column 7,
Line 58, delete "data comprising" and insert -- data, comprising: --.

Column 8,
Line 10, after "comprises" insert -- : --.
Line 66, after "comparing" and before "assembling", replace "." with -- ; --.

Column 9,
Line 2, after "comprises" insert -- : --.
Line 42, delete "other of the s being" and insert -- other of the element locations being --.
Line 57, after "comprises" insert -- : --.

Column 12,
Line 22, delete "and".

Signed and Sealed this

Twenty-second Day of January, 2002

Attest:

*Attesting Officer*

JAMES E. ROGAN
*Director of the United States Patent and Trademark Office*